United States Patent
Katsuzawa (10) Patent No.: US 11,157,223 B2
(45) Date of Patent: Oct. 26, 2021

(54) COLOR CONVERSION METHOD, COLOR CONVERSION DEVICE AND PROGRAM

(71) Applicant: Mimaki Engineering Co., Ltd., Nagano (JP)

(72) Inventor: Yuta Katsuzawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/872,471

(22) Filed: May 12, 2020

(65) Prior Publication Data

US 2020/0364015 A1    Nov. 19, 2020

(30) Foreign Application Priority Data

May 17, 2019  (JP) .............. JP2019-093298

(51) Int. Cl.
*G06F 3/12*    (2006.01)
*H04N 1/60*    (2006.01)

(52) U.S. Cl.
CPC .......... *G06F 3/1255* (2013.01); *G06F 3/1208* (2013.01); *G06F 3/1219* (2013.01); *G06F 3/1273* (2013.01); *H04N 1/603* (2013.01)

(58) Field of Classification Search
CPC .... G06F 3/1255; G06F 3/1208; G06F 3/1219; H04N 1/62; H04N 1/54; H04N 1/603
USPC .......................................... 358/1.9
See application file for complete search history.

(56) References Cited

U.S. PATENT DOCUMENTS

2012/0250040 A1\* 10/2012 Yamazaki .............. B41J 2/2142
                                                                 358/1.8
2013/0250322 A1\* 9/2013 Kawabata ............ H04N 1/6055
                                                                 358/1.9

FOREIGN PATENT DOCUMENTS

JP    2010-010862    1/2010

\* cited by examiner

*Primary Examiner* — Miya J Williams
*Assistant Examiner* — Darryl V Dottin
(74) *Attorney, Agent, or Firm* — Finnegan, Henderson, Farabow, Garrett & Dunner, LLP (57) ABSTRACT

A color conversion method for performing color conversion on print data includes a color conversion process of converting a color of a pre-conversion color system used to express a color in the print data before the color conversion is performed to a color of an ink color system corresponding to inks of multiple colors, and in the color conversion process, a position selecting process of selecting some positions from the positions in the print data, a profile using process of converting the color of each position in the print data according to a profile associating the colors before and after the conversion, and a color correcting process of performing correction on results of color conversion in the profile using process with respect to the selected position selected in the position selecting process to obtain a color expressed using ink of the predetermined number of colors or less.

10 Claims, 4 Drawing Sheets

COLOR CONVERSION METHOD, COLOR CONVERSION DEVICE AND PROGRAM

CROSS REFERENCE TO RELATED APPLICATIONS

This application claims the priority benefit of Japanese Patent Application No. 2019-093298, filed on May 17, 2019. The entirety of the above-mentioned patent application is hereby incorporated by reference herein and made a part of this specification.

TECHNICAL FIELD

The present disclosure relates to a color conversion method, a color conversion device, and a program.

BACKGROUND

Conventionally, a printing apparatus (e.g., an inkjet printer) that performs color printing through an inkjet method has been widely used. When color printing is performed with such a printing apparatus, usually, a color conversion process is performed according to the color of the ink used for printing with respect to the print data using, for example, an International Color Consortium (ICC) profile or the like (see e.g., Japanese Unexamined Patent Publication No. 2010-010862).

SUMMARY

It is sometimes required to express some colors using one color of ink as-is, for example, depending on the conditions required for printing. In this case, for example, when colors are to be expressed with only one color of ink (e.g., pure colors, primary colors) pure colors are sometimes retained. More specifically, in this case, the setting of the colors is performed so that color conversion is performed using an ICC profile or the like for colors other than pure colors, and the color is expressed with only one color of ink without preforming color conversion using an ICC profile or the like for pure colors. With this configuration, for example, mixing of inks of other colors, turbidity, and the like can be appropriately prevented at the position where pure color is retained.

However, if the manner of processing differs between the pure color and the other colors in this way, the color continuity may be insufficient in the converted color, and the printing result may be affected. More specifically, in this case, for example, a tone jump or the like may occur between a color close to the pure color and the pure color, which may affect the printing result. Therefore, conventionally, it has been desired to more appropriately perform color conversion according to the color of ink. Therefore, the present disclosure provides a color conversion method, a color conversion device, and a program that may address the above-described problems.

The inventor of the present application conducted an intensive study on a method of performing color conversion more appropriately while preventing the above-described tone jump and the like. Then, the inventor considered further performing color correction after performing color conversion using the ICC profile, and the like instead of not performing the color conversion using the ICC profile or the like for the pure color. In this correction, it is considered that the correction is performed so that only the corresponding one color of ink is used for a pure color.

In this case, by performing the color conversion using the ICC profile or the like even on the pure color, the color conversion can be performed under the same condition as the color other than the pure color at that time. Furthermore, by performing color correction thereafter, a pure color can be appropriately expressed using only one color of ink in accordance with the conditions required for printing, and the like.

In this case, color conversion using an ICC profile or the like is performed, and correction is performed on the result, so that the concentration and the like of one color of ink for expressing a pure color can be appropriately brought closer to a case in which another color close to the pure color is expressed. Therefore, with this configuration, for example, color conversion can be performed more appropriately while preventing a tone jump or the like. Moreover, such a manner of color conversion is not limited to a pure color, and it can be similarly performed for a color expressed with a mixed color of a predetermined number of colors (e.g., two colors) less than the number of ink colors to be used.

Through further thorough research, the inventor of the present application found features necessary for obtaining such effects and contrived the present disclosure. In order to solve the problems described above, the present disclosure provides a color conversion method for performing color conversion on print data indicating an image to be printed that is used in a printing apparatus that performs color printing using inks of multiple colors based on the print data, the method including: a color conversion process of converting a color of a pre-conversion color system that is a color system used to express a color in the print data before the color conversion is performed to a color of an ink color system that is a color system corresponding to the inks of multiple colors; where in the color conversion process, a data input process of inputting the print data in which the color of each position of the image is set in the pre-conversion color system, a position selecting process of selecting some positions from the positions in the print data, the position selecting process including selecting a position where the color is to be expressed using ink of a predetermined number of colors or less than the number of colors of the inks of multiple colors, a profile using process of converting the color of each position in the print data according to a profile which is data associating the colors before and after the conversion, the profile using process converting the color of the pre-conversion color system to the color of the ink color system based on the profile, and a color correcting process of performing correction on results of color conversion in the profile using process with respect to the selected position, which is the position selected in the position selecting process, to obtain a color expressed using ink of the predetermined number of colors or less are performed.

In the case of such a configuration, for example, for a color expressed using ink of a predetermined number of colors or less, the correction of matching the number of ink colors to use can be appropriately performed after performing color conversion based on the profile. Therefore, with this configuration, for example, color conversion can be performed more appropriately while preventing a tone jump or the like. Furthermore, for example, color conversion on print data in accordance with the color of ink can be appropriately performed.

In this configuration, for example, the printing apparatus performs color printing using inks of at least each color of cyan, magenta, and yellow. In this case, for the ink color system, for example, it is conceivable to use a color system (e.g., a CMYK color system) that expresses a color using at least each of cyan, magenta, and yellow. With this configuration, color printing can be appropriately performed in the printing apparatus. Furthermore, for such a profile, for example, a known profile such as an ICC profile can be suitably used.

In this configuration, the position selecting process can be considered as, for example, a process of selecting a position where a predetermined color is set. Furthermore, in this case, the operation of the position selecting process can be considered as, for example, an operation of selecting a color to be expressed using ink of a predetermined number of colors or less. Moreover, in this configuration, the color expressed using ink of a predetermined number of colors or less is, for example, a pure color (primary color) which is a color expressed with one color of ink, or a secondary color expressed with two colors of ink. In this case, in the position selecting process, for example, a position where a color is to be expressed using inks of two colors or less is selected as the selected position. Selecting a position means, for example, selecting a pixel. Furthermore, in the position selecting process, it is conceivable to select, as the selected positions, a position where a color should be expressed using two colors of ink and a position where a color should be expressed using only one color of ink. In this case, in the color correcting process, for example, for the position where the color is to be expressed using two colors of ink among the selected positions, the color is corrected so that the color is expressed using two colors of ink after the correction. Furthermore, for a position where a color is to be expressed using only one color of ink, the color is corrected so that the color is expressed using only one color of ink after the correction. With this configuration, for example, the color can be appropriately converted for a pure color and a secondary color.

More specifically, in this configuration, in the position selecting process, for example, a color of an ink of a predetermined number of colors or less is further specified as a used ink color, which is a color of an ink used to express the color of the selected position, with respect to each selected position. In the profile using process, for example, an ink usage rate that is a value associated with each usage rate of the inks of multiple colors is set as the color of the ink color system. In the color correcting process, for example, for the ink usage rate set in the profile using process with respect to the selected position, the ink usage rate is corrected so as not to use a color other than the color specified as the used ink color with respect to the selected position in the position selecting process. With this configuration, for example, the color conversion process can be more appropriately performed.

In the color correcting process, for example, among the ink usage rates set in the profile using process with respect to the selected position, the ink usage rate corresponding to a non-used ink color that is a color other than the color specified as the used ink color with respect to the selected position in the position selecting process is changed to a value indicating not to use the ink. In this case, for example, among the ink usage rates set in the profile using process with respect to the selected position, it is considered that the ink usage rate corresponding to the color specified as the used ink color with respect to the selected position in the position selecting process is not changed. According to such a configuration, for example, the color correcting process can be easily and appropriately performed.

In the color correcting process, the ink usage rate corresponding to the color specified as the used ink color with respect to the selected position in the position selecting process may be changed based on the value before the ink usage rate corresponding to the non-used ink color is changed. With this configuration, for example, the ink usage rate corresponding to the used ink color can be adjusted according to the change amount of the ink usage rate corresponding to the non-used ink color. Thus, for example, color correction in the color correcting process can be performed with higher accuracy.

Furthermore, in this configuration, as the printing apparatus, for example, it is conceivable to use a printing apparatus that performs printing on a fabric medium, a printing apparatus that performs printing on a transfer medium that is a medium used for transfer to another medium, or the like. In these cases, for example, when a color is expressed by mixing inks of multiple colors, a granular feeling or the like becomes noticeable if a color having a significantly lower ink usage rate compared to the other colors is mixed. Thus, for example, for pure colors, secondary colors, and the like, when only color conversion using a profile is simply performed, a color component with a small ink usage rate mix, thus causing the granular feeling to be noticeable and the quality of printing to lower. On the other hand, when the color conversion process is performed on the print data used by these printing apparatuses as described above, color components with a low ink usage rate can be appropriately prevented from mixing unintendedly. Thus, for example, high-quality printing can be performed more appropriately even in the printing apparatus for an application in which granular feeling, and the like tend to be noticeable.

Furthermore, as a configuration of the present disclosure, it is conceivable to use a color conversion device, a program and the like having the features similar to above. In this case as well, for example, effects similar to the above can be obtained.

According to the present disclosure, color conversion can be appropriately performed on print data in accordance with the color of ink. A printing system disclosed herein may comprise: a storage medium storing computer-readable instructions therein, the computer-readable instructions, causing the printing system to execute a color conversion process according to one embodiment of the present disclosure.

BRIEF DESCRIPTION OF THE DRAWINGS

FIGS. 1A and 1B are views describing a printing system 10 that executes a color conversion process according to one embodiment of the present disclosure.

FIGS. 2A to 2C are views describing a conventional color conversion operation and the like in further detail.

FIGS. 3A and 3B are views describing the color conversion operation and the like performed in the present example in further detail.

FIGS. 4A and 4B are views describing the effect obtained by the present example in more detail.

DETAILED DESCRIPTION

Figure 1A:
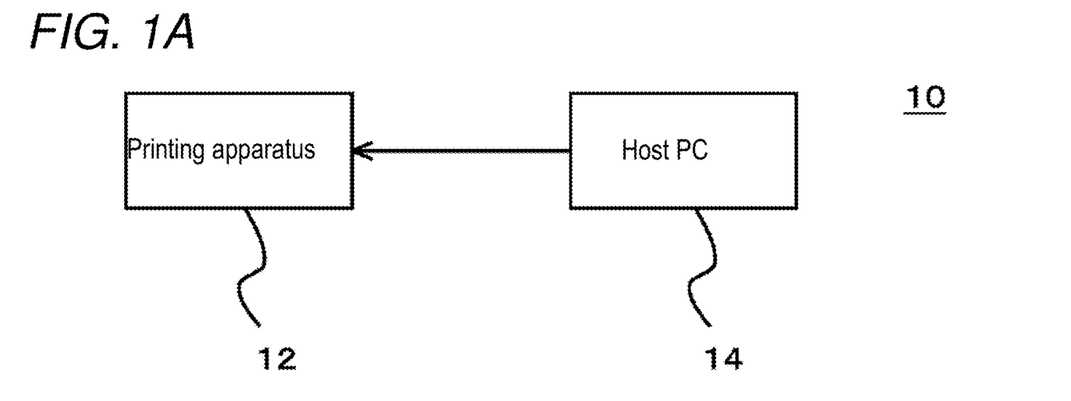
FIG. 1A shows an example of a configuration of the printing system 10.
Figure 1B:
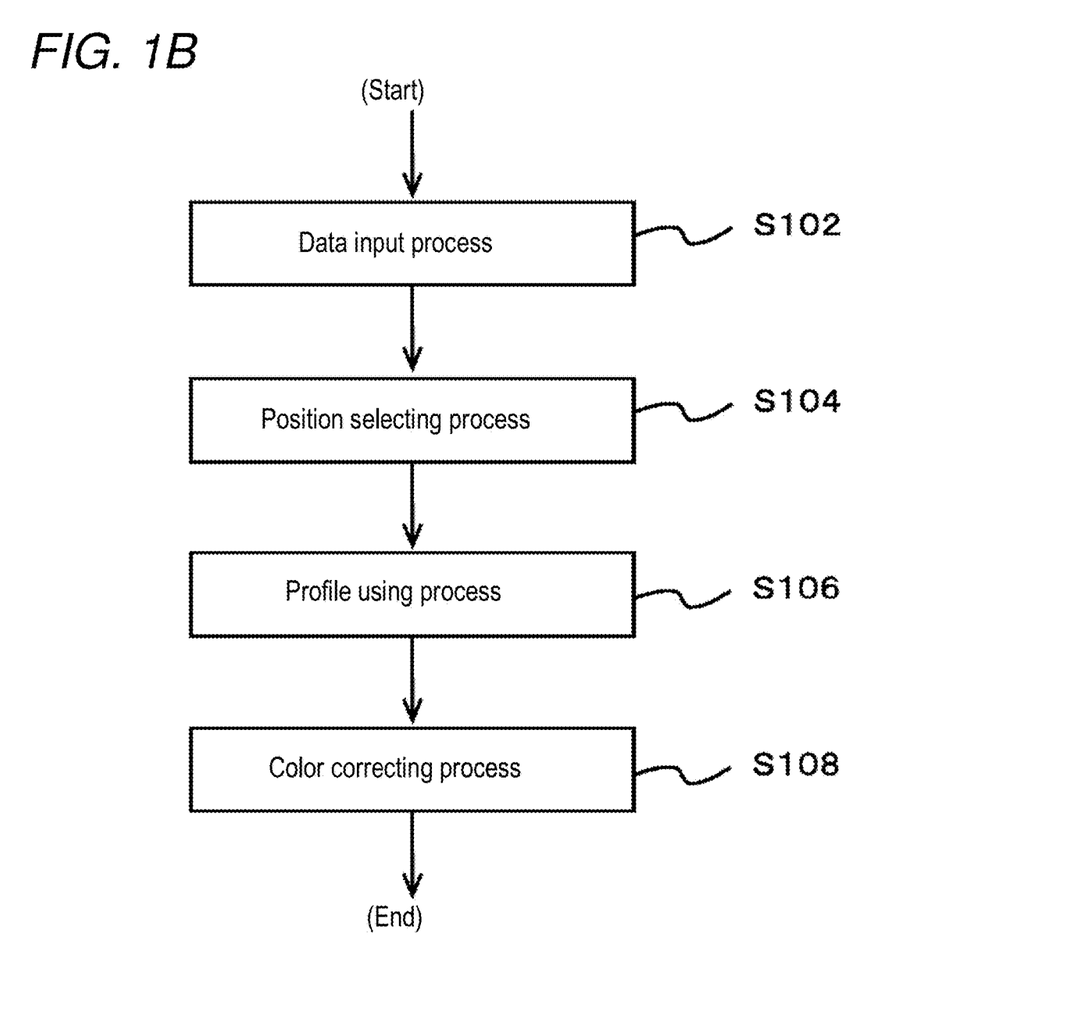
FIG. 1B is a flowchart showing an example of a color conversion process executed by a host PC 14 in the printing system 10.

Hereinafter, some embodiments according to the present disclosure will be described with reference to the drawings. FIGS. 1A and 1B are views describing a printing system 10 that executes a color conversion process according to one embodiment of the present disclosure. FIG. 1A shows an example of a configuration of the printing system 10. Other than the aspects described below, the printing system 10 and the color conversion process executed in the printing system 10 may include the same or similar features as those of a known printing system and color conversion process.

In the present example, the printing system 10 is a system that performs color printing on a medium (media) to be printed through an inkjet method, and includes a printing apparatus 12 and a host PC 14. The printing apparatus 12 is an inkjet printer that performs printing through an inkjet method, includes a plurality of inkjet heads corresponding to inks of a plurality of different colors, and performs color printing by receiving print data indicating an image to be printed from the host PC 14, and ejecting each color ink from each inkjet head based on the print data.

A known inkjet printer can be suitably used as the printing apparatus 12. Furthermore, in the printing apparatus 12, it can be considered to use inks of each color of cyan (C), magenta (M), and yellow (Y), for example, for inks of multiple colors. Moreover, in the printing apparatus 12 of the present example, black (color: K) ink is further used. With this configuration, for example, the color printing (e.g., full color printing) can be appropriately performed in the printing apparatus 12.

The host PC 14 is a computer that controls the operation of the printing apparatus 12, and controls the operation of the printing apparatus 12 by providing print data to the printing apparatus 12 according to a predetermined program which is stored in a memory of the host PC 14. In the present example, the host PC 14 performs a predetermined color conversion process on the print data, and provides the print data after the color conversion to the printing apparatus 12. In this case, the operation of the host PC 14 that performs the color conversion process according to the program which is stored in a memory of the host PC 14 can be considered to be operating as, for example, a color conversion device.

FIG. 1B is a flowchart illustrating an example of a color conversion process (color conversion method) executed in the host PC 14, and illustrates an example of an operation of performing color conversion on the print data. In this example, the host PC 14 performs the color conversion process on the print data according to the color of the ink used in the printing apparatus 12. In this case, the color conversion process according to the color of the ink used in the printing apparatus 12 can be considered as, for example, a process of converting a color of a pre-conversion color system, which is a color system used to express the color in the print data before the color conversion is performed, to a color of an ink color system, which is a color system corresponding to the inks of multiple colors used in the printing apparatus 12. Furthermore, in the present example, in the color conversion process, a process is performed of reducing the number of ink colors to be used to less than or equal to a predetermined number for the color at the selected position.

More specifically, when performing the color conversion process, the host PC 14 first performs a process of inputting print data (data input process S102). In this case, the host PC 14 inputs the print data by receiving the print data from outside the host PC 14 through, for example, a network or a storage medium. Furthermore, for example, the host PC 14 may input the print data by generating the print data in the host PC 14 by user operation. Moreover, as described above, the color conversion process performed in the present example is a process of converting the color of the pre-conversion color system to the color of the ink color system. Therefore, in this example, in the data input process S102, print data in which the color at each position of the image is set in the pre-conversion color system is input.

In the present example, the color of each position in the print data refers to the color of each pixel forming the image indicated by the print data. In this case, the pixel can be considered as, for example, a position corresponding to an ink ejection position determined according to the resolution of printing. In this example, it is conceivable to use a color of the CMYK color system, for example, as the color of the pre-conversion color system. Furthermore, a color of the RGB color system or the like may be used as the color of the pre-conversion color system.

Following the data input process S102, the host PC 14 performs a process of selecting a position (pixel) to be corrected in a color correcting process S108 to be performed later (position selecting process S104). As will be described in further detail later, in the present example, in the color correcting process S108, correction is performed on a position where a color is to be expressed with a pure color (primary color) or a secondary color so as to retain a desired color. Therefore, in the position selecting process S104, a position to be represented by a pure color or a secondary color is selected. In this case, selecting a position to be expressed with a pure color or a secondary color means, for example, selecting a pixel in the print data in which a color corresponding to the pure color or the secondary color is set. In addition, the pure color can be considered as, for example, a color expressed with only one color of ink. The secondary color can be considered as, for example, a color expressed with two colors of ink.

When the position to be selected in the position selecting process S104 is defined as the selected position, the operation of the position selecting process S104 may be considered as, for example, an operation of selecting a position where color should be expressed using two or less colors of ink. More specifically, in the position selecting process S104 of the present example, the host PC 14 selects a position where a color should be expressed using two colors of ink and a position where a color should be expressed using only one color of ink. Furthermore, in this case, the position where the color should be expressed using the two colors of ink can be considered as, for example, a position where the secondary color is to be retained. The position where the color should be expressed using only one color of ink can be considered as, for example, a position where a pure color is to be retained. The operation of selecting such a position can be considered as, for example, an operation of a process of selecting a pixel to retain a color (color retention pixel selecting process).

Furthermore, in the present example, the pure color and the secondary color are examples of colors expressed using inks of a predetermined number of colors or less, the predetermined number being less than the number of ink colors used in the printing apparatus 12. Therefore, the operation of the position selecting process S104 can also be considered as, for example, an operation of selecting a color to be expressed using inks of a predetermined number of colors or less. Furthermore, in the present example, in the position selecting process S104, a position where the color in the print data before the color conversion is a pure color or a secondary color is selected as a position where the color is to be expressed with the pure color or the secondary color. Therefore, the operation of the position selecting process S104 can also be considered as, for example, an operation of a process of selecting a position where a predetermined color is set. The position selecting process S104 is, for example, a process of selecting some positions from the positions in the print data, and can be considered as a process of selecting a position where the color should be expressed using inks of a predetermined number of colors or less, which is less than the number of colors of inks of multiple colors used in the printing apparatus 12.

In the position selecting process S104 of the present example, the host PC 14 further specifies the used ink color, which is the color of the ink used to express the color of the selected position, in association with the selected position. In this case, a color of ink of a predetermined number of colors or less is specified as a used ink color for each selected position. More specifically, in this case, for a selected position selected as a position where a pure color should be expressed, one color corresponding to the pure color is specified as the used ink color. Furthermore, for a selected position selected as a position where a secondary color should be expressed, two colors included in the secondary color are specified as the used ink colors. Moreover, in the present example, the specification of the used ink color is automatically performed based on the color (color information of the print data) set to each position in the print data.

Following the position selecting process S104, the host PC 14 converts the color set at each position in the print data according to a predetermined profile (profile using process S106). In this case, the profile can be considered as, for example, data that associates colors before and after the conversion. Furthermore, the profile can be considered as, for example, data that associates each position in a plurality of color spaces. As such a profile, a known profile can be suitably used. As such a known profile, an ICC profile or the like can be suitably used.

The profile using process S106 can be considered as, for example, a process of converting the color of each position in the print data according to the profile. More specifically, in the profile using process S106 of the present example, the host PC 14 converts the color of each position in the print data from the color of the pre-conversion color system to the color of the ink color system based on the profile. In this case, as the ink color system, for example, it is conceivable to use a color system that expresses a color using at least each of cyan, magenta, and yellow may be used. With this configuration, the printing apparatus 12 can appropriately perform color printing. More specifically, in the present example, a CMYK color system is used as the ink color system.

In the present example, in the profile using process S106, an ink usage rate, which is a value associated with each usage rate of inks of multiple colors, is set as the color of the ink color system. In this case, the ink usage rate may be, for example, a value corresponding to the concentration of the color of ink used to represent the color at each position (each pixel).

Here, in the printing apparatus 12, it is conceivable to perform a control using binary data generated by performing raster image processor (RIP) process or the like based on print data, for example, for the operation of ejecting ink. On the other hand, in the present example, the print data used in the profile using process S106 is data before being converted into binary data. Therefore, it is conceivable to set not a value corresponding to the binary data but a value indicating the concentration within a predetermined range such as 0 to 100%, for example, for the ink usage rate. More specifically, in this case, for example, it is conceivable to set for the concentration of one color of ink used for expressing the color of one pixel, a value indicating the concentration of the ink of each color as the ink usage rate with respect to the ink of each color (each of cyan, magenta, yellow and black) with the minimum value as 0% and the maximum value as 100%. Furthermore, in this case, it can be considered that a concentration of 0% indicates that the color is not used. Moreover, a concentration of 100% can be considered as, for example, the concentration of ink when an ink droplet of a predetermined maximum volume is ejected to an ejecting position corresponding to each pixel.

Also, as described above, in the present example, it is conceivable to use, for example, a color of a CMYK color system as the color of the pre-conversion color system. In this case, in the profile using process S106, conversion from the color of the CMYK color system to the color of the CMYK color system is performed. However, in this case as well, the ratio (color mixture ratio) of each color (cyan, magenta, yellow, and black) used as the basic color of the color expression is not considered to be usually the same before and after the conversion. More specifically, in this case, as the color before conversion, for example, a color expressed without taking into consideration the characteristics of the ink used in the printing apparatus 12 may be used. In this case, the pre-conversion color system can be considered to be, for example, a color system that does not depend on the characteristics of the printing apparatus 12.

On the other hand, as can be understood from the above description and the like, the ink color system used for expressing the post-conversion color is a color system that takes into consideration the characteristics of the ink used in the printing apparatus 12. In this case, the ink color system can be considered to be, for example, a color system that depends on the characteristics of the printing apparatus 12. Furthermore, the operation of color conversion performed using the profile in the profile using process S106 can be considered as, for example, a color matching operation for converting a color in accordance with the characteristics of the printing apparatus 12.

In the profile using process S106, the color conversion performed according to the profile may be performed using, for example, a plurality of profiles. In this case, by using a plurality of profiles, for example, it is conceivable that the color spaces corresponding to the colors before and after the conversion are not directly associated but are associated with each other with another color space interposed therebetween. More specifically, in this case, the host PC 14 converts the color of the pre-conversion color system into the color of the "Lab" color system based on, for example, the first profile. Furthermore, the color of the Lab color system is converted into the color of the ink color system based on the second profile.

Following the profile using process S106, the host PC 14 performs a process of correcting the color conversion result in the profile using process S106 (color correcting process S108). Furthermore, in the present example, in the color correcting process S108, correction is performed on the color conversion result for the selected position selected in the position selecting process S104 so as to be the color expressed using ink of a predetermined number of colors or less. More specifically, as described above, in the position selecting process S104, a position where the color should be expressed with a pure color (primary color) and a position where the color should be expressed with a secondary color are selected as the selected position. In the present example, selecting a position to be expressed with a pure color or a secondary color means selecting a pixel to be expressed with a pure color or a secondary color. Furthermore, in this case, a position where a color should be expressed with a pure color can be considered as, for example, a position where a color should be expressed using only one color of ink. The position where a color should be expressed with a secondary color can be considered as, for example, a position where a color should be expressed using two colors of ink. Then, in the color correcting process S108, for example, the color is corrected so that a color is expressed using only one color of ink after the correction at a position where the color should be expressed with the pure color among the selected positions. In addition, at the position where the color should be expressed with the secondary color, the color is corrected so that the color is expressed using two colors of ink after the correction. Furthermore, in the present example, the host PC 14 performs the operation of the color correcting process S108, thereby ending the operation of the flowchart illustrated in FIG. 1B. The operation of the color correcting process S108 will be described in more detail below. According to the present example, for example, color conversion can be performed more appropriately for a pure color and a secondary color.

Next, the correction operation performed in the color correcting process S108 will be described in more detail. First, a conversion result and the like in a case where colors are converted without performing the correction as performed in the color correcting process S108 of the present example will be described. To convert a color without performing the correction as performed in the color correcting process S108 means, for example, to perform color conversion according to a profile such as an ICC profile on a color set in the input print data, and use the conversion result as it is. In the following, for the sake of convenience of explanation, an operation of converting a color without performing the correction as performed in the color correcting process S108 is referred to as a conventional color conversion operation. In the conventional color conversion operation, it is conceivable to also perform a process of retaining a pure color or a secondary color in addition to the color conversion performed according to the profile. In this case, it is conceivable to directly set a pure color or a secondary color to be retained, without using a conversion result obtained by following a profile, for example, for a position for retaining a pure color or a secondary color. Furthermore, such an operation can be considered as, for example, an operation in which the operations of the position selecting process S104 and the color correcting process S108 are different from the operation of the flowchart illustrated in FIG. 1B.

Figure 2A:
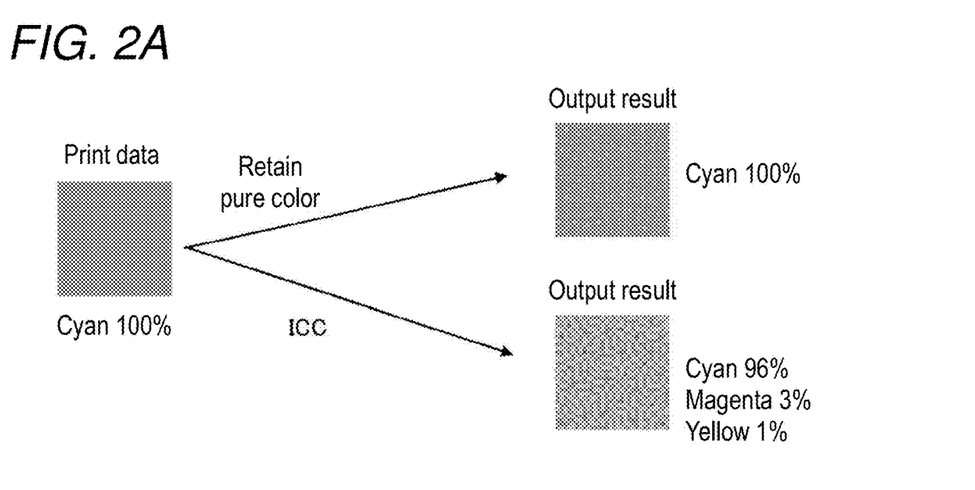
FIG. 2A shows an example of a color conversion result in the conventional color conversion operation.
Figure 2B:
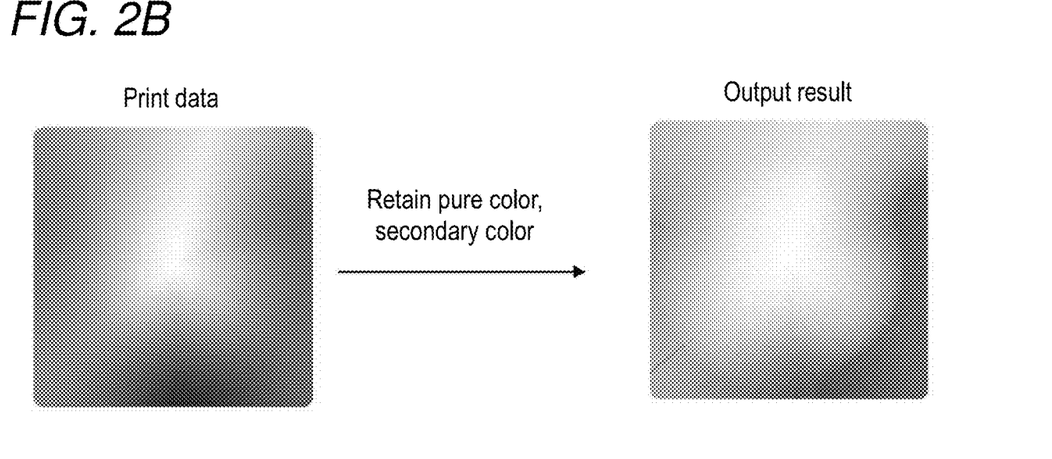
FIG. 2B shows an example of the result of conversion on various colors in the conventional color conversion operation.
Figure 2C:
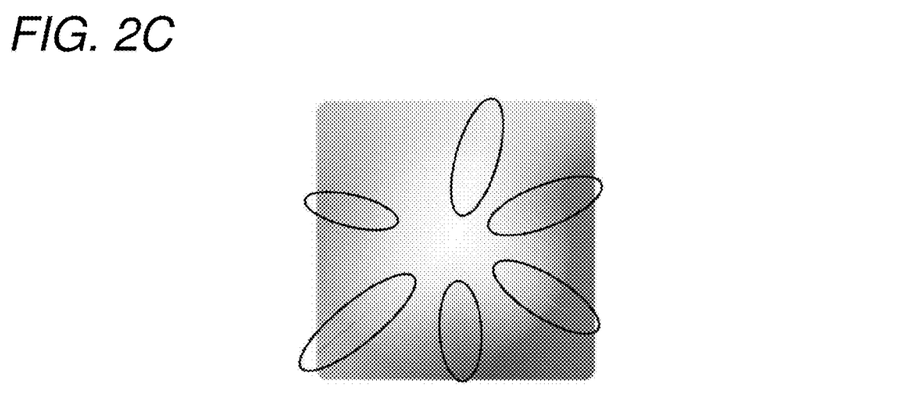
FIG. 2C shows the notable positions by circling with an ellipse for the post-conversion colors in FIG. 2B.

FIGS. 2A to 2C are views describing the conventional color conversion operation and the like in further detail. In the figures after FIGS. 2A to 2C, for the sake of convenience of illustration, the drawings in which various colors are displayed in color are illustrated with gray-scaled images.

FIG. 2A is a view showing an example of a color conversion result in a conventional color conversion operation, and shows an example of a conversion result for a cyan having a concentration of 100%. In this case, a cyan color having a concentration of 100% can be considered as an example of a pure color. Furthermore, FIG. 2A shows an example of a result when a pure color is retained, and a result when color conversion is performed according to the ICC profile as a conversion result.

As shown in the figure, in the conventional color conversion operation, when the pure color is to be retained, the result (output result) of color conversion with respect to the pure color to be retained becomes a value indicating the pure color to be retained. More specifically, in the case shown in the figure, the result of conversion when a pure color is retained for a cyan having a concentration of 100% is a value indicating a cyan having a concentration of 100%.

On the other hand, when color conversion is performed on the same color according to the ICC profile, the conversion result may not necessarily be the pure color, as shown in the figure. More specifically, in the case shown in the figure, in the conversion result for cyan having a concentration of 100%, the concentration of cyan is 96%, the concentration of magenta is 3%, and the concentration of yellow is 1%.

FIG. 2B is a view showing an example of a conversion result for various colors in the conventional color conversion operation, and shows an example of colors before and after conversion for a case where a pure color and a secondary color are retained. FIG. 2C is a view showing the notable positions by circling with an ellipse for the post-conversion colors (output results) in FIG. 2B. As described above, when a pure color is retained in the conventional color conversion operation, a value indicating a pure color to be retained is used as a color conversion result (output result). Furthermore, in this case, when the secondary color is to be retained, a value indicating the secondary color to be retained may be used as a color conversion result.

However, in this case, there is a difference in the manner of color conversion process between the pure color and the secondary color for retaining the colors and the other colors. In this case, the other colors are, for example, colors including components of each color of cyan, magenta, and yellow. In addition, as a result, in a region including a pure color or a secondary color, such as a region circled by an ellipse in FIG. 2C, the continuity of the post-conversion color becomes insufficient, and a tone jump or the like may occur. It is also conceivable that the occurrence of a tone jump or the like may affect the printing result.

In the present embodiment, as described above with reference to FIGS. 2A to 2C and the like, correction is performed on the result of performing color conversion using a profile such as an ICC profile for a pure color and a secondary color, so that the pure color and the secondary color are retained. In the case of such a configuration, for example, the influence of the ICC profile can be appropriately reflected even in the result of color conversion for a pure color and a secondary color. In addition, for example, occurrence of a tone jump or the like can be more appropriately suppressed.

Figure 3A:
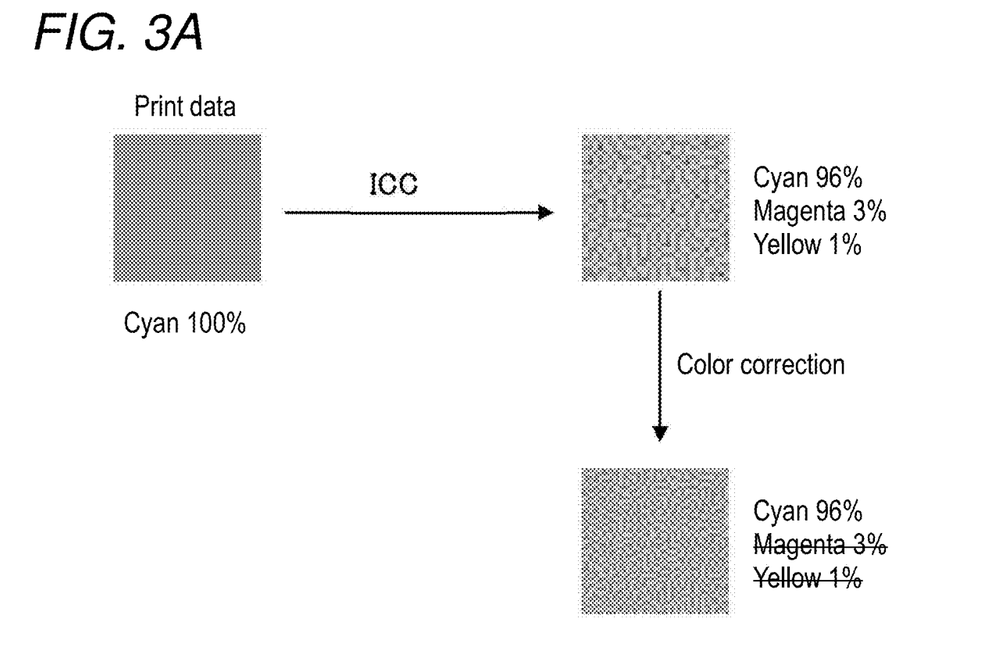
FIG. 3A shows an example of a color conversion operation with respect to a pure color.

FIGS. 3A to 3C are views describing in more detail the operation of color conversion, and the like performed in the present example. FIG. 3A is a view showing an example of an operation of a color conversion for a pure color, and shows an example of an operation when performing a color conversion for retaining a pure color with respect to a cyan having a concentration of 100%. In the present example, in the profile using process S106 (see FIGS. 1A and 1B), an ICC profile created in advance according to the characteristics of the ink used in the printing apparatus 12 (see FIGS. 1A and 1B) is used as the profile. In the illustrated case, the same ICC profile as that used in the conventional color conversion described with reference to FIG. 2A is used as the ICC profile. In this case, in the post-conversion color at the time point the color conversion is performed in the profile using process S106, the concentration of cyan is 96%, the concentration of magenta is 3%, and the concentration of yellow is 1% as in the case shown in FIG. 2A.

On the other hand, in the present example, as described above, the color is corrected in the color correcting process S108 (see FIGS. 1A and 1B). Then, when retaining the pure color, the color is corrected in such a correction so that the colors are expressed using only one color of ink after the correction. More specifically, in this case, correction is performed on the post-conversion color in the profile using process S106 so as to delete components of colors other than cyan, which is a pure color to be retained. In this case, in the corrected color, the concentration of cyan is 96%, and the concentration of other colors is 0%.

With this configuration, for example, mixing of other colors can be appropriately prevented at a position where a pure color is to be retained. In this case, as the concentration of the pure color, a concentration that reflects the result of the color conversion in the profile using process S106 is used. Thus, the continuity of post-conversion color can be appropriately increased, for example, as compared with the case of performing conventional color conversion. Thus, for example, occurrence of an unintended tone jump or the like can be appropriately prevented. Furthermore, in some cases, when inks of each color of cyan, magenta, and yellow are used as in the present example, if these three colors are mixed, a black component is generated, and the color becomes turbid. On the other hand, according to the present example, the occurrence of such turbidity can be appropriately prevented.

Figure 3B:
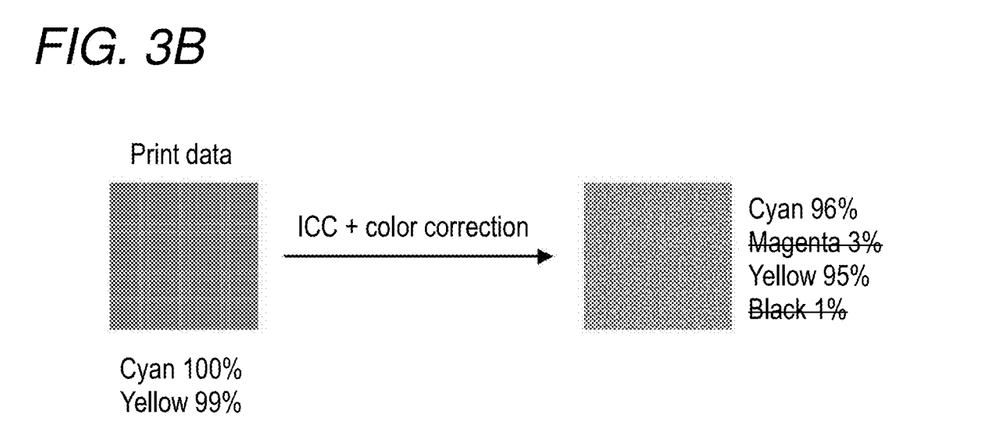
FIG. 3B shows an example of a color conversion operation with respect to a secondary color.

Such an effect can be similarly obtained when retaining the secondary color. FIG. 3B is a view showing an example of an operation of a color conversion for a secondary color, and shows an example of an operation when performing a color conversion for retaining a secondary color with a cyan concentration of 100% and a yellow concentration of 99%. In this case, in the post-conversion color at the time point the color conversion is performed in the profile using process S106, the concentration of cyan is 96%, the concentration of magenta is 3%, the concentration of yellow is 95%, and the concentration of black is 1%.

On the other hand, when retaining a secondary color in the present example, in the color correcting process S108, color correction is performed so that colors are expressed using two colors of ink after the correction, as described above. More specifically, in this case, the correction is performed with respect to the post-conversion color in the profile using process S106 so as to delete components of colors other than cyan and yellow, which are the two colors constituting the secondary color to be retained. In this case, in the corrected color, the concentration of cyan becomes 96%, the concentration of yellow becomes 95%, and the concentration of other colors becomes 0%.

In this case as well, for example, mixing of other colors other than the two colors constituting the secondary color can be appropriately prevented at a position where the secondary color is to be retained. Thus, for example, the secondary color can be appropriately retained while appropriately preventing the occurrence of color turbidity caused by mixing of other colors. In this case as well, as the concentration of the two colors constituting the secondary colors, the concentrations reflecting the result of the color conversion in the profile using process S106 are used. Thus, the continuity of post-conversion color can be appropriately increased, for example, as compared with the case of performing conventional color conversion. Thus, for example, occurrence of an unintended tone jump or the like can be appropriately prevented.

Thus, in the present example, the color conversion based on the profile is performed for the pure color and the secondary color, and then the correction for matching the number of colors of ink to be used is performed. In this case, as described above, for example, color conversion can be performed more appropriately while preventing a tone jump or the like. Therefore, according to the present example, for example, the pure color and the secondary color can be retained more appropriately while maintaining affinity with a color other than the color to be retained.

Figure 4A:
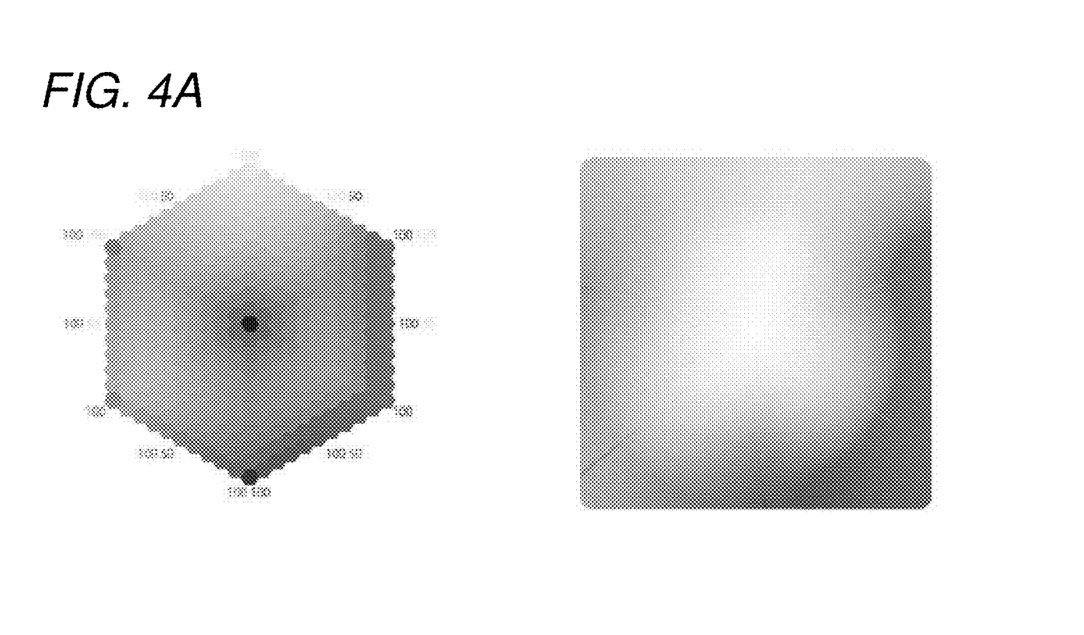
FIG. 4A shows an example of a result of conventional color conversion performed while retaining a pure color and a secondary color.
Figure 4B:
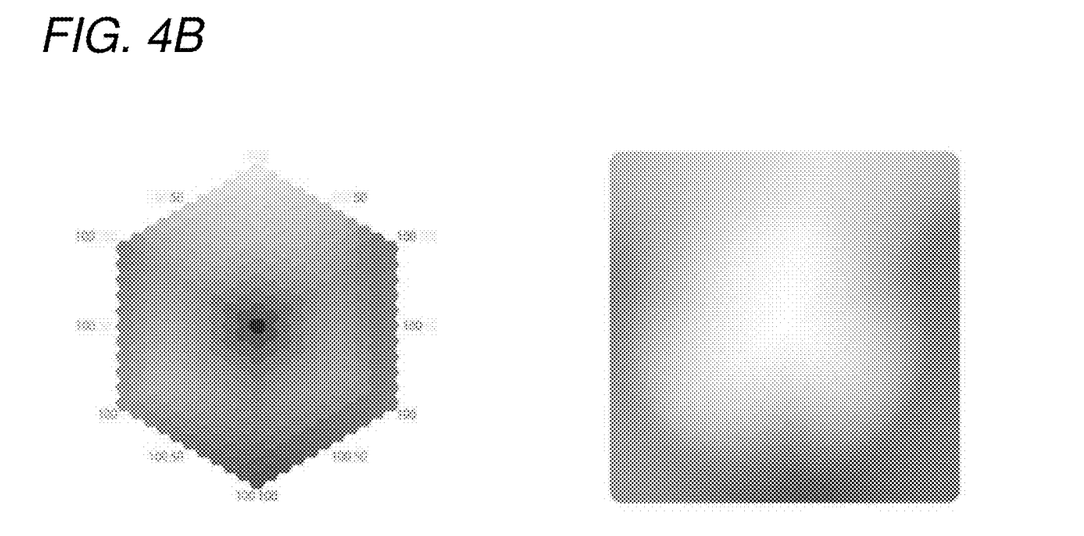
FIG. 4B shows an example of a result of the color conversion performed in the present example.

FIGS. 4A and 4B are views describing the effect obtained by the present example in more detail. FIG. 4A shows an example of a result of conventional color conversion performed while retaining a pure color and a secondary color. FIG. 4B shows an example of a result of the color conversion performed in the present example. As can be understood from the above description and the illustrated matters and the like, according to the present example, for example, a pure color and a secondary color can be retained while appropriately preventing a tone jump or the like. In this case, the difference between the color of the retaining target and the color other than the retaining target is less noticeable than in the case where the operation of the conventional color conversion is performed, and thus, for example, color conversion can be performed more appropriately with higher accuracy with respect to the print data in which the color of the retaining target and the color other than the retaining target coexist.

Furthermore, in a case where the conventional color conversion is performed, tone jump and the like become more noticeable, so that for example, even when retaining the secondary color, the secondary colors that can be retained are sometimes limited. More specifically, in the secondary colors, when the concentration of the two colors constituting the secondary color is different (when the ratio of the colors constituting the secondary color is different), the tone jump may be particularly noticeable if the secondary color is retained by the conventional color conversion. Thus, in the conventional color conversion, the secondary colors are normally retained only when the ratio of the colors constituting the secondary colors is equal.

On the other hand, in the present example, even when the ratios of the colors constituting the secondary colors are different (a case where the ratio is not equal in the secondary colors), the secondary color can be more appropriately retained while preventing the occurrence of tone jumps and the like. Furthermore, this makes it possible to, for example, more appropriately express the secondary colors with high gradation, to retain more various secondary colors with high quality, and the like. More specifically, in this case, for example, it is possible to more appropriately retain the color of, for example, orange with no turbidity or blue with a strong cyan taste, and output the result as a print result.

Next, supplementary description regarding each configuration described above, description on a modified example, and the like will be made. As described above, in the present example, in the color correcting process S108 (see FIGS. 1A and 1B), the color is corrected so that the color is expressed using only one color of ink after the correction at the position where the color should be expressed with a pure color. In addition, at the position where the color should be expressed with the secondary color, the color is corrected so that the color is expressed using two colors of ink after the correction. Furthermore, as described above, in the present example, in the profile using process S106 (see FIGS. 1A and 1B), the ink usage rate associated with the usage rate of each of the inks of multiple colors is set as the color of the ink color system.

In this case, focusing on the ink usage rate, the operation in the color correcting process S108, for example, can be considered as an operation of correcting the ink usage rate so as not to use, with respect to the ink usage rate set in the profile using process S106 for the selected position, ink other than the used ink at the selected position. In this case, as described above, the used ink color is the color specified in the position selecting process S104 (see FIGS. 1A and 1B) as the color of the ink used to express the color of each selected position. Furthermore, correcting the ink usage rate so as not to use ink other than the ink used at the selected position means, for example, correcting the ink usage rate so as not to use non-used ink color, which is a color other than the color specified as the used ink color for the selected position in the position selecting process S104. In addition, such an operation can be considered as, for example, an operation of correcting the ink usage rate corresponding to the non-used ink color, among the ink usage rates set in the profile using process S106 for the selected position, to a value indicating not to use ink, and the like.

In the color correcting process S108 of the present example, as described above, the value set in the profile using process S106 is used as-is as the value after the correction, for example, for the ink usage rate corresponding to the non-used ink color. More specifically, in this case, in the color correcting process S108, for example, among the ink usage rates set in the profile using process S106 for the selected position, the ink usage rate corresponding to the color specified as the used ink color with respect to the selected position in the position selecting process S104 is not changed. With this configuration, for example, the operation of the color correcting process S108 can be performed easily and appropriately.

Furthermore, in a modified example of the operation of the color correcting process S108, the ink usage rate corresponding to the used ink color may be changed. In this case, for example, consideration is made to change the ink usage rate corresponding to the used ink color specified for the selected position in the position selecting process S104 based on the value before the change of the ink usage rate corresponding to the non-used ink color. In this case, the value before the change in the ink usage rate corresponding to the non-used ink color is a value before the correction is performed in the color correcting process S108. With this configuration, for example, the ink usage rate corresponding to the used ink color can be adjusted according to the change amount of the ink usage rate corresponding to the non-used ink color. Thus, for example, color correction in the color correcting process S108 can be performed with higher accuracy.

Furthermore, as described above, in the present example, in the position selecting process S104, a position (pixel) to be subjected to the correcting process in the color correcting process S108 is selected. In this case, for the selection of a position, for example, it is conceivable to automatically select a pixel to which a pure color or a secondary color is set, based on the color set in the print data. Furthermore, it is also conceivable to perform the selection of a position in the position selecting process S104 while receiving instruction from a user rather than performing the selection completely automatically. In this case, for example, it is conceivable that an instruction to select a region of one part in the image indicated by the print data is received from the user, and the position is selected only within the region. More specifically, for example, in the print data, other than places where the user intends to express with a pure color or a secondary color, a pixel where a pure color or a secondary color is accidentally set in performing various color expressions may form. For such pixels, it is sometimes preferable to perform similar process on peripheral pixels without performing the correcting process, described above, on such pixels. Also, depending on the region in the image, it may be more important to maintain the concentration of ink of each color than to prevent a tone jump. In such a case, as described above, it is preferable to select a position in the region selected by the user. Furthermore, regarding the colors to be retained, in the present example, all the pure colors and the secondary colors may be considered. However, in a modified example of the color conversion process, not all the pure colors and the secondary colors may be the target, and only some of the colors selected based on the instruction from the user may be the target. In this case, in the position selecting process S104, for example, a position corresponding to the color selected by the user may be selected.

In the description made above, the operation of performing color conversion on a pure color or a secondary color has been mainly described. On the other hand, as described above, in the printing apparatus 12 of the present example, black ink corresponding to a tertiary color is further used. In this case, the black color can be considered to be a color that can be expressed with only one color of ink. However, if the correction in the color correcting process S108 is performed for the tertiary color in the same manner as for the pure color or the secondary color, a tone jump may occur due to the influence of the correction. More specifically, when assuming a tertiary color in which the concentration of cyan is 50%, the concentration of magenta is 40%, and the concentration of yellow is 30%, and the like, for example, as a color before conversion in the profile using process S106, it is conceivable that the concentration of black (the amount of black ink) becomes dominant in the color after the conversion. In such a case, if a correction is performed to delete the black component that was not included as an input for conversion, the concentration of the color may reduce greatly, and the color may be far from the intended color. Therefore, for the tertiary color, it is preferable that the correction in the color correcting process S108 is not performed, and the result of the conversion (color after the conversion) in the profile using process S106 is used as is.

In addition, as described above, a known inkjet printer can be suitably used as the printing apparatus 12 in the printing system 10 of the present example. In this case, it is conceivable to use, as the printing apparatus 12, an inkjet printer for an application in which it is particularly desired to retain a pure color or a secondary color. More specifically, as the printing apparatus 12, for example, an inkjet printer that performs printing on a fabric medium, an inkjet printer that performs printing on a transfer medium, which is a medium used for transfer to another medium, or the like is used. In these cases, for example, when a color is expressed by mixing inks of multiple colors, a granular feeling or the like becomes noticeable if a color having a significantly lower ink usage rate compared to the other colors is mixed. More specifically, for example, when printing is performed on a fabric medium, the size (e.g., diameter) of the ink dot tends to becomes large as the ink penetrates through the fabric. Furthermore, when printing is performed on a transfer medium, the size of ink dots tends to become large in the transferred image due to the effect of applying pressure at the time of transfer. In these cases, it is assumed that the granular feeling becomes particularly noticeable as the size of the ink dot increases.

Therefore, in these cases, when only the color conversion using a profile is simply performed for pure colors, secondary colors, and the like, color components with a low ink usage rate mix, thus causing the granular feeling to be noticeable and the quality of printing to easily lower. On the other hand, when the color conversion process is performed on the print data as described above, color components with a low ink usage rate can be appropriately prevented from mixing unintendedly. Thus, for example, high-quality printing can be performed more appropriately even in the printing apparatus 12 for an application in which granular feeling, and the like tend to be noticeable.

In addition, as described above, in the present example, the operation of the host PC 14 that performs the color conversion process according to the program can be considered to be operating as, for example, a color conversion device. In this case, it can be considered that each unit of the host PC 14 operates as each unit of the color conversion device. More specifically, for example, it can be considered that a part of the host PC 14 that externally receives print data (e.g., a network interface or a reading unit of a storage medium etc.) functions as a data input unit that executes a data input process S102 (see FIGS. 1A and 1B). Further, the CPU of the host PC 14 may be considered to function as, for example, a position selecting unit that executes the position selecting process S104, a profile processing unit that executes the profile using process S106, and a color correcting unit that executes the color correcting process S108.

Furthermore, in the above description, the operation of the printing apparatus 12 in the case of an inkjet printer that prints a two-dimensional image has been mainly described. However, as the printing apparatus 12, for example, it is also conceivable to use a 3D printer that shapes a three-dimensional shaped object. In this case, for example, the printing apparatus 12 shapes a shaped object through a layered shaping method by layering a plurality of ink layers. Furthermore, by performing shaping using inks of multiple colors, a shaped object in which one part is at least colored is shaped. In this case, as inks of multiple colors, it is preferable to further use white and clear inks, in addition to, for example, cyan, magenta, yellow, and black inks. Even in such a case, the color conversion can be performed more appropriately by performing the color conversion as described above.

INDUSTRIAL APPLICABILITY

The present disclosure can be suitably used, for example, in a color conversion method.

What is claimed is:

1. A color conversion method for performing color conversion on print data indicating an image to be printed that is used in a printing apparatus that performs color printing using inks of multiple colors based on the print data, the method comprising:
a color conversion process of converting a color of a pre-conversion color system that is a color system used to express a color in the print data before the color conversion is performed to a color of an ink color system that is a color system corresponding to the inks of multiple colors, wherein
in the color conversion process,
a data input process of inputting the print data in which the color of each position of the image is set in the pre-conversion color system,
a position selecting process of selecting some positions from the positions in the print data, the position selecting process including selecting a position where the color is to be expressed using ink of less than or equal to a predetermined number of colors, the predetermined number of colors being less than a number of colors of the inks of multiple colors,
a profile using process of converting the color of each position in the print data according to a profile which is data associating the colors before and after the conversion, the profile using process converting the color of the pre-conversion color system to the color of the ink color system based on the profile, and
a color correcting process of performing correction on results of color conversion in the profile using process with respect to the selected position, which is the position selected in the position selecting process, to obtain a color expressed using ink of the predetermined number of colors or less are performed,
the color of the pre-conversion color system including three or more colors,
the color correcting process including performing correction using two or less colors among the three or more colors,
in the position selecting process, a color of an ink of the two or less colors is further specified for each of the selected positions as a used ink color that is a color of ink used to express the color of the selected position,
in the profile using process, an ink usage rate, which is a value associated with each usage rate of the inks of the three or more colors, is set as the color of the ink color system, and
in the color correcting process, the ink usage rate is corrected for the ink usage rate set in the profile using process with respect to the selected position so as not to use a color other than the color specified as the used ink color among the two or less colors with respect to the selected position in the position selecting process.

2. The color conversion method according to claim 1, wherein in the color correcting process, among the ink usage rates set in the profile using process with respect to the selected position, the ink usage rate corresponding to the color specified as the used ink color for the selected position in the position selecting process is not changed.

3. The color conversion method according to claim 1, wherein
in the color correcting process,
among the ink usage rates set in the profile using process with respect to the selected position,
the ink usage rate corresponding to a non-used ink color that is a color other than the color specified as the used ink color with respect to the selected position in the position selecting process is changed to a value indicating not to use the ink, and
the ink usage rate corresponding to the color specified as the used ink color with respect to the selected position in the position selecting process is changed based on a value before the ink usage rate corresponding to the non-used ink color is changed.

4. The color conversion method according to claim 1, wherein
the printing apparatus performs color printing using inks of at least each color of cyan, magenta, and yellow, and
the ink color system is a color system that expresses a color using at least each of cyan, magenta, and yellow.

5. The color conversion method according to claim 1, wherein in the position selecting process, a position where a color is to be expressed using two or less colors of ink is selected as the selected position.

6. The color conversion method according to claim 1, wherein
in the position selecting process, a position where a color is to be expressed using two colors of ink and a position where a color is to be expressed using only one color of ink are selected as the selected position; and
in the color correcting process, among the selected positions,
color correction is performed on the position where the color is to be expressed using the two colors of ink to express the color using two colors of ink after the correction, and
color correction is performed on the position where the color is to be expressed using only one color of ink to express the color using only one color of ink after the correction.

7. The color conversion method according to claim 1, wherein color conversion is performed on the print data used in the printing apparatus that performs printing on a fabric medium.

8. The color conversion method according to claim 1, wherein color conversion is performed on the print data used in the printing apparatus that performs printing on a transfer medium that is a medium used for transfer to another medium.

9. A color conversion device that performs color conversion on print data indicating an image to be printed that is used in a printing apparatus that performs color printing using inks of multiple colors based on the print data, wherein
the color conversion device is configured to perform a color conversion process of converting a color of a pre-conversion color system that is a color system used to express a color in the print data before the color conversion is performed to a color of an ink color system that is a color system corresponding to the inks of multiple colors,
the color conversion device comprising a computer configured to:
receive input of the print data in which the color of each position of the image is set in the pre-conversion color system;
select some positions from the positions in the print data, the position selecting unit selecting a position where the color is to be expressed using ink of less than or equal to a predetermined number of colors, the predetermined number of colors being less than a number of colors of the inks of multiple colors;
convert the color of each position in the print data according to a profile which is data associating the colors before and after the conversion, the profile processing unit converting the color of the pre-conversion color system to the color of the ink color system based on the profile; and
perform correction on results of color conversion in the profile processing unit with respect to the selected position, which is the position selected by the position selecting unit, to obtain a color expressed using ink of the predetermined number of colors or less,
the color of the pre-conversion color system including three or more colors,
the computer is configured to further perform:
correction using two or less colors among the three or more colors,
further specifying a color of an ink of the two or less colors for each of the selected positions as a used ink color that is a color of ink used to express the color of the selected position,
setting an ink usage rate, which is a value associated with each usage rate of the inks of the three or more colors, as the color of the ink color system, and
correcting the ink usage rate for the ink usage rate set with respect to the selected position so as not to use a color other than the color specified as the used ink color among the two or less colors with respect to the selected position.

10. A non-transitory computer-readable storage medium program for causing a computer to execute a color conversion process of performing color conversion on print data indicating an image to be printed that is used in a printing apparatus that performs color printing using inks of multiple colors based on the print data, wherein
the color conversion process is a process of converting a color of a pre-conversion color system that is a color system used to express a color in the print data before the color conversion is performed to a color of an ink color system that is a color system corresponding to the inks of multiple colors; and
in the color conversion process, the program causes the computer to execute:
a data input process of inputting the print data in which the color of each position of the image is set in the pre-conversion color system,
a position selecting process of selecting some positions from the positions in the print data, the position selecting process including selecting a position where the color is to be expressed using ink of less than or equal to a predetermined number of colors, the predetermined number being less than a number of colors of the inks of multiple colors,
a profile using process of converting the color of each position in the print data according to a profile which is data associating the colors before and after the conversion, the profile using process converting the color of the pre-conversion color system to the color of the ink color system based on the profile, and
a color correcting process of performing correction on results of color conversion in the profile using process with respect to the selected position, which is the position selected in the position selecting process, to obtain a color expressed using ink of the predetermined number of colors or less,
the color of the pre-conversion color system including three or more colors,
the color correcting process including performing correction using two or less colors among the three or more colors,
in the position selecting process, a color of an ink of the two or less colors is further specified for each of the selected positions as a used ink color that is a color of ink used to express the color of the selected position, in the profile using process, an ink usage rate, which is a value associated with each usage rate of the inks of the three or more colors, is set as the color of the ink color system, and in the color correcting process, the ink usage rate is corrected for the ink usage rate set in the profile using process with respect to the selected position so as not to use a color other than the color specified as the used ink color among the two or less colors with respect to the selected position in the position selecting process.

* * * * *

UNITED STATES PATENT AND TRADEMARK OFFICE
CERTIFICATE OF CORRECTION

PATENT NO. : 11,157,223 B2  
APPLICATION NO. : 16/872471  
DATED : October 26, 2021  
INVENTOR(S) : Yuta Katsuzawa Page 1 of 1

It is certified that error appears in the above-identified patent and that said Letters Patent is hereby corrected as shown below:

In the Claims

Claim 10, Column 18, Lines 25-26, delete "A non-transitory computer-readable storage medium program for causing" and insert --A non-transitory computer-readable storage medium for causing--.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*